United States Patent
Adolph

(10) Patent No.: US 6,703,606 B2
(45) Date of Patent: Mar. 9, 2004

(54) NEUTRON BURST TIMING METHOD AND SYSTEM FOR MULTIPLE MEASUREMENT PULSED NEUTRON FORMATION EVALUATION

(75) Inventor: Robert A. Adolph, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 241 days.

(21) Appl. No.: 09/929,680

(22) Filed: Aug. 14, 2001

(65) Prior Publication Data

US 2002/0036260 A1 Mar. 28, 2002

Related U.S. Application Data

(60) Provisional application No. 60/236,118, filed on Sep. 28, 2000.

(51) Int. Cl.[7] .................................................. G01V 5/10
(52) U.S. Cl. ............................ 250/269.1; 250/269.4; 250/269.6; 250/390.01; 250/391
(58) Field of Search ................. 250/390.01, 390.06, 250/390.1, 291, 269.4, 269.5, 269.6, 269.7, 269.8, 269.1

(56) References Cited

U.S. PATENT DOCUMENTS

| | | |
|---|---|---|
| 4,647,781 A | 3/1987 | Takagi et al. |
| 4,760,252 A | 7/1988 | Albats et al. |
| 4,883,956 A | 11/1989 | Melcher et al. |
| 4,926,044 A | 5/1990 | Wraight |
| 4,972,082 A | 11/1990 | Loomis et al. |
| 5,235,185 A | 8/1993 | Albats et al. |
| RE36,012 E | 12/1998 | Loomis et al. |
| 6,032,102 A | 2/2000 | Wijeyesekera et al. |
| 6,207,953 B1 * | 3/2001 | Wilson ..................... 250/269.4 |

OTHER PUBLICATIONS

Combined Search and Examination Report dated May 28, 2002 for GB 0122631.5.

* cited by examiner

Primary Examiner—Constantine Hannaher
Assistant Examiner—Timothy Moran
(74) Attorney, Agent, or Firm—Victor H. Segura; Brigitte L. Jeffrey; John J. Ryberg

(57) ABSTRACT

A method is disclosed for measuring neutron interaction properties of an earth formation. The method includes irradiating the formation with bursts of high energy neutrons. The bursts have a duration selected to enable detection of short duration burst related phenomena. After at least one of the bursts, short duration burst related phenomena are measured. After a selected number of the bursts, long duration neutron burst-related phenomena are detected. In some embodiments, the short duration burst related phenomena include at least one of inelastic gamma ray related phenomena, neutron slowing down related phenomena and short capture cross section related phenomena.

45 Claims, 2 Drawing Sheets

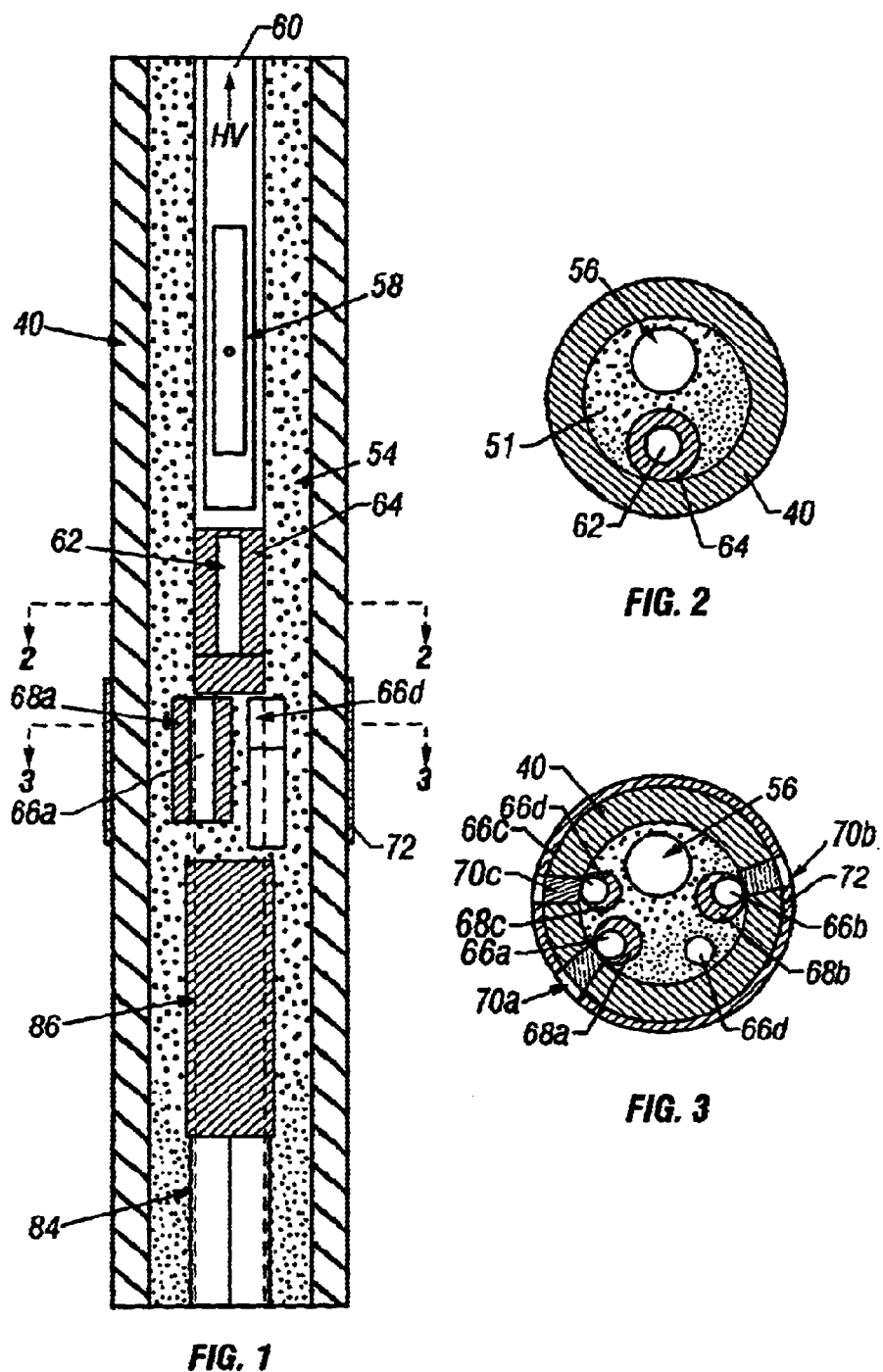

NEUTRON BURST TIMING METHOD AND SYSTEM FOR MULTIPLE MEASUREMENT PULSED NEUTRON FORMATION EVALUATION

CROSS-REFERENCE TO RELATED APPLICATIONS

This invention claims priority from U.S. Provisional Application Serial No. 60/236,118 filed on Sep. 28, 2000.

BACKGROUND OF THE INVENTION

1. Field of the Invention

The invention relates generally to pulsed neutron well logging instruments. More specifically, the invention relates to neutron burst timing sequences used to acquire selected types of pulsed neutron measurements to determine selected properties of earth formations.

2. Background Art

Pulsed neutron well logging instruments known in the art are used to measure a number of different properties of earth formations penetrated by wellbores. The most common types of pulsed neutron instruments include an accelerator-type source which emits controlled duration "bursts" of high energy neutrons into the formations surrounding the wellbore, and one or more detectors that measure numbers of neutrons, particularly epithermal energy and thermal energy, as well as gamma rays which are emitted as a result of the interaction of the neutrons with the formations surrounding the wellbore and the fluids in the wellbore itself. The gamma rays may include inelastic gamma rays which are emitted by high-energy collisions of the neutrons with atomic nuclei in the earth formations, as well as capture gamma rays emitted when low energy (thermal) neutrons are captured by susceptible atomic nuclei in the formations. Properties of the earth formations which may be determined as a result of measuring neutron detection rate and gamma rays include bulk density of the formation, fractional volume of void or pore space in the formation (porosity), and neutron capture cross section, among other measurements. Properties which may be determined by spectral analysis of the gamma rays include concentration of various chemical elements, for example. Properties of fluids in the wellbore may also be determined from various neutron and gamma ray measurements.

Instruments which can make measurements of a plurality of the foregoing types are described, for example, in U.S. Pat. No. 6,032,102 issued to Wijeyesekera et al., and in U.S. Pat. No. Re. 36,012 issued to Loomis et al., both of which are assigned to the assignee of the present invention. Generally speaking, the instruments disclosed in these patents are arranged so that a pulsed neutron source therein emits a plurality of short duration neutron bursts, these being of a duration to enable relatively accurate measurement of density, through spectral analysis of inelastic gamma rays, and accurate measurement of porosity, through measurement of neutron "slowing down time", or rate of decay of detected neutron count rate with respect to time shortly after the end of each neutron burst. A neutron detector positioned axially proximate the source is used on such instruments to make the neutron slowing down time measurements. A gamma ray detector positioned appropriately with respect to the source, and coupled to a spectral analyzer, is used to make the inelastic gamma ray measurements. The short duration bursts are repeated for a selected number of times and the measurements made in appropriate time windows during and/or after each neutron burst are summed or stacked to improve the statistical precision of the measurements made therefrom.

The instruments described in the above patents are also adapted to measure neutron capture cross section of the earth formations. The manner in which these instruments make neutron capture cross section measurements is conventional, and includes, after the previously described plurality of short duration bursts and measurement windows, a relatively long duration burst, after which capture gamma rays or thermal neutrons are measured at appropriately spaced detectors therefor. The measurements are characterized to determine neutron capture cross section of the formations surrounding the instrument.

Another pulsed neutron instrument which makes measurements related to neutron interaction phenomena induced by both short duration and long duration neutron bursts is described, for example, in U.S. Pat. No. 4,926,044 issued to Wraight. Generally, this instrument makes measurements, after short duration neutron bursts, of phenomena related to short capture cross section components in the wellbore and formations surrounding the instrument. Longer capture cross section components are evaluated by operating radiation detectors after long duration bursts, as is conventional for capture cross section determination.

A pulsed neutron logging instrument which is adapted to measure both "short burst"-related neutron interaction phenomena, such as density and porosity, as well as "long burst"-related neutron interaction phenomena, such as capture cross section, has an inherent limitation. This limitation is that the long bursts used to make their associated measurements reduce the number of available neutrons for making measurements associated with the short bursts. While a burst timing sequence could be devised which increases the number of short burst measurement cycles at the expense of the number of long burst measurement cycles, such a timing sequence may reduce the statistical precision of the long burst related measurements, or may limit the speed at which the logging instrument may be moved along the wellbore while still making reasonably precise measurements.

It is desirable to have a pulsed neutron well logging instrument and method which can make both long burst related measurements and short burst related measurements with improved statistical precision.

SUMMARY OF THE INVENTION

One aspect of the invention is a method for measuring neutron interaction properties of an earth formation. The method includes irradiating the formation with bursts of high energy neutrons. The bursts have a duration selected to enable detection of short duration neutron burst related phenomena. During or after at least one of the bursts, short burst related phenomena are detected. After a selected number of the bursts, long duration neutron burst-related phenomena are detected.

In some embodiments, the short duration burst related phenomena include at least one of the following types: neutron slowing down time related phenomena, inelastic gamma ray related phenomena, and short-duration capture cross section related phenomena. In some embodiments, a length of time during which the long duration neutron burst phenomena are detected is selected to optimize a duty cycle of a pulsed neutron source used to perform the activating. In some embodiments, the length of time is selected so as to optimize the duty cycle and the statistical precision of measurements of capture cross section at a highest expected value thereof for the earth formations being evaluated. In some embodiments, the length of time is selected to optimize accuracy of measurement of the long duration burst phenomena.

Another aspect of the invention is an instrument for detecting neutron interaction phenomena in earth formations surrounding a wellbore. The instrument includes a controllable source of high energy neutrons. The instrument includes radiation detectors. At least one of the detectors is adapted to detect neutron slowing down phenomena occurring in the earth formations and at least one of the detectors is adapted to detect inelastic gamma ray phenomena. At least one of the detectors is adapted to detect long duration neutron burst related phenomena. The instrument includes a controller operatively coupled to the source and detectors. The controller is adapted to cause the neutron source to emit bursts of high energy neutrons. The bursts have a duration selected to enable detection of the inelastic gamma ray phenomena. The controller is adapted to cause detection of the inelastic gamma ray phenomena during each burst and to cause detection of the neutron slowing down time phenomena proximate the end of each burst. The controller is adapted to cause detection of the capture cross section phenomena after the end of a selected number of the bursts.

Other aspects and advantages of the invention will be apparent from the following description and the appended claims.

BRIEF DESCRIPTION OF THE DRAWINGS

FIG. 1 shows a vertical cross section of an example of a pulsed neutron well logging instrument which can be used with a method according to the invention.

FIG. 2 shows a horizontal cross section along line 2—2 of FIG. 1.

FIG. 3 shows a horizontal cross section along line 3—3 of FIG. 1.

DETAILED DESCRIPTION

Figure 4:
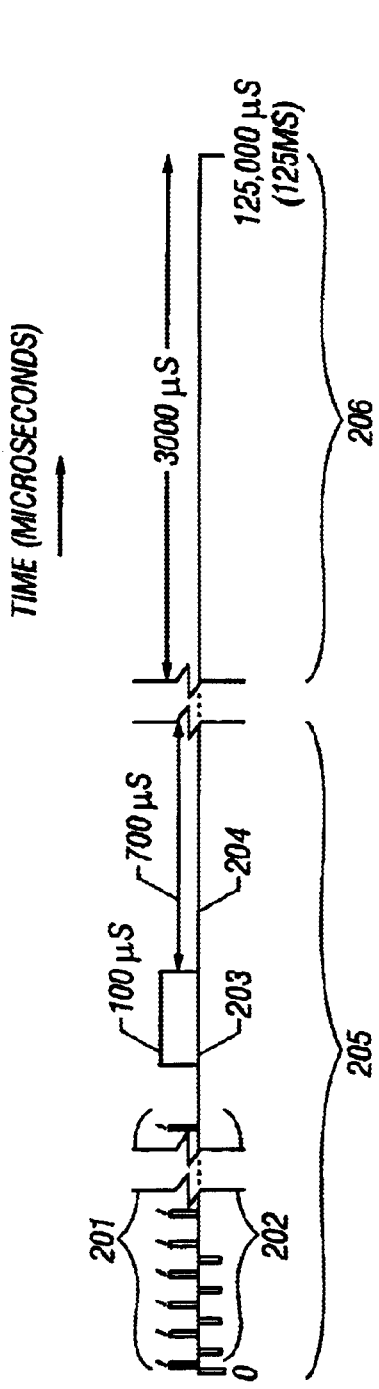
FIG. 4 shows a prior art neutron burst timing diagram used in an instrument such as shown in FIG. 1.

One example of a pulsed neutron well logging instrument which can make use of a method according to the invention is shown in FIGS. 1–3. The example instrument of FIGS. 1–3 is particularly suited for measurement-while-drilling ("MWD") operation, where the instrument is conveyed through a wellbore attached to a drill string. It should be clearly understood, however, that the configuration of the instrument, and the manner of conveying the instrument which is used with any embodiment of the invention is not limited to that shown in FIGS. 1–3, nor is the invention limited to instruments which are conveyed by attachment to a drill string. Instrument conveyance by armored electrical cable, as is conventional for "wireline" well logging is clearly within the scope of this invention. Other forms of conveyance, such as in a probe or drill collar adapted to operate while "tripping" drill pipe into or out of a wellbore, or on "slickline" (a wire or cable having no electrical conductors therein) may also be used in various embodiments of the invention.

A drill collar section 40 is shown as surrounding a stainless steel tool chassis 54. The drill collar section 40 may be of any suitable size, for example, 8 inch outside diameter and 5 inch inside diameter. Formed in the chassis 54 to one side of the longitudinal axis thereof, and as best observed in FIGS. 2 and 3, is a longitudinally extending mud channel 56 for enabling movement of drilling fluid through the drill string. Eccentered to the other side of the chassis 54 are a pulsed neutron source 58, and associated control and high voltage supply electronic circuit system 60 and a coaxially aligned near spaced detector 62. The pulsed neutron source 58 is preferably a deuterium-tritium accelerator of any type known in the art having a generated neutron energy of about 14 MeV.

The near spaced detector 62 is preferably adapted to detect epithermal neutrons, so as to be primarily responsive to output of the source 58 with minimal effect of the formations surrounding the instrument. The detector 62 may be a $He^3$ proportional counter or the like, surrounded by a shield 64 made from a combined neutron moderating/absorbing material, such as one disclosed in U.S. Pat. No. 4,760,252, for example. Alternatively, the detector 62 may be a higher energy neutron counter such as a $He^4$ counter surrounded by tungsten or other high atomic number material. However arranged, the combination of detector type, shielding and position of the detector 62 is preferably selected so that the detector 62 responds substantially entirely to the output of the source 58, with minimal effect from the wellbore or surrounding formation. To that end, the detector 62 may comprise an epithermal neutron detector for example, a $^3$He proportional counter, which is located close to the source 58 without intervening high density shielding. The sensitive volume of this type of detector 62 is clad in cadmium or other high thermal neutron capture cross section material (not shown) to raise the detection threshold to epithermal energy levels. The detector 62 in this example is also surrounded, preferably on all surfaces except that adjacent to the source 58, by a shield 64 of combined neutron-moderating and neutron-absorbing material, such as boron carbide (or other 1/v type absorber) distributed in an epoxy (or other hydrogenous material) binder ("B4CE"). More detailed information concerning the structure and function of the shielding for such a near-spaced $^3$He detector is described, for example, in U.S. Pat. No. 4,760,252.

Alternatively, the near detector 62 may be a higher energy neutron detector, such as a $^4$He detector, surrounded by tungsten, "heavimet" or other high-Z (atomic number) shielding to both shield the detector from the formation and to multiply the number of non-formation neutrons incident upon the detector. The multiplication in effect is due to the large (n, 2n) and (n, 3n) cross section of the high-Z material, which converts each of the 14 million electron volt (MeV) neutrons emanating from the source 58 into two or three neutrons having energy level below approximately 6 MeV, in which energy range the scattering cross section of $^4$He is relatively large. Thus, the high-Z shielding not only decreases the sensitivity of the near-detector 62 signal to formation-scattered neutrons, it also effectively attenuates the neutron flux from the source 58 along the instrument.

If, as described below, the farther-spaced neutron detectors are shielded in a B4CE (or like combination moderating-absorbing) material, the slowing down power of the hydrogen in the moderating-absorbing material can be used to further reduce the energy of the neutrons, while the absorbing power of the boron serves to attenuate the low energy neutron flux. The ordering of the shielding materials, high-Z material near the neutron source 58, and the B4CE (or like) material following, is critical, as the reverse order is ineffective to shield high energy neutrons.

Whether the near-spaced detector 62 is a low energy neutron detector or a high energy neutron detector, the combined effect of the detection energy, placement and shielding of the near detector 62 should be such as to render the detector output relatively insensitive to formation porosity and primarily proportional to the neutron flux from the source 58, as previously explained. The output of the near detector 62 may then be used to normalize other detector outputs for strength fluctuation of the source 58.

Located longitudinally adjacent to the near-spaced detector 62 is a plurality or "array" of detectors 66a, 66b, 66c and 66d. The array generally includes one, and preferably more than one, epithermal neutron detector and a gamma ray detector. One or more thermal neutron detectors may optionally be included. As shown in FIG. 3, there are two epithermal detectors 66a, 66b, one thermal neutron detector 66c and one gamma ray detector 66d. A different number or mix of detectors may be provided if desired.

The principal purpose of the epithermal neutron detectors 66a, 66b is to measure the epithermal neutron flux in the formation at a spacing sufficiently close to the neutron source 58 to minimize, or at least significantly reduce, the effect on the detector outputs of heavier formation elements, such as oxygen, silicon, carbon, calcium, etc., which dominate bulk density, and to maximize, or at least enhance, the influence of formation hydrogen on the detector response. This is so the detector response will depend primarily on the hydrogen index with only a residual lithology (formation mineral composition) effect. To enhance the detector sensitivity to the formation, the epithermal detectors 66a, 66b, which may be $^3$He proportional counters, are preferably located closely adjacent the drill collar 40 wall and back-shielded, as shown at 68a and 68b, to reduce borehole neutron sensitivity. The shielding material is preferably the same as that described previously in connection with the near detector 62, i.e., cadmium cladding and B4CE. As described more fully below, neutron-transparent windows 70a and 70b are preferably formed in the drill collar to further enhance detector sensitivity and to provide a greater depth of investigation.

As illustrated in FIG. 3, the epithermal neutron detectors 66a, 66b and associated windows 70a, 70b are preferably spaced apart circumferentially of the drill collar 40 for enhanced angular or azimuthal resolution. Any desired circumferential spacing of the detectors may be used. Although the detectors 66a, 66b are all shown as being at the same longitudinal spacing from the accelerator 58, one or more additional detectors may be provided at different longitudinal spacings for different vertical resolution. Circumferentially and horizontally spaced detector arrays, as well as further details concerning the configuration of the individual detectors and their shielding, are described in more detail in U.S. Pat. Nos. 4,760,252 and 4,972,082. A neutron slowing down time measurement can be made using the various detector signals as described in the '082 patent.

It is to be noted that the source/detector spacings described in U.S. Pat. Nos. 4,760,252 and 4,972,082 are those which are appropriate for wireline-conveyed instruments. Somewhat longer spacings may be provided in a measurement-while-drilling (MWD) instrument to account for the fact that the detectors are responding to neutron related phenomena through the drill collar 40.

The thermal neutron detector 66c may also be a $^3$He proportional counter that is shielded, as shown at 68c, similarly to the epithermal detectors 66a, 66b, except that the cadmium cladding is omitted on the formation side to render the detector sensitive to formation thermal neutrons. A neutron transparent window 70c may be provided in the drill collar 40 adjacent to the thermal detector 66c. Additional thermal neutron detectors may be provided as needed to obtain the desired horizontal and/or vertical resolution. The output signals from the thermal neutron detector(s) 66c may be processed as described, for example, in U.S. Pat. No. 4,760,252, to derive a thermal neutron porosity measurement and/or in accordance with the disclosure of U.S. Pat. No. 5,235,185, for example, to derive measurements of formation capture cross section and instrument standoff from the wall of the wellbore.

The gamma ray detector 66d may comprise any suitable high-density, high temperature-rated detector, such as NaI, BGO, CsI, anthracene, etc., or, for example, a cerium-activated gadolium orthosilicate (GSO) detector, such as disclosed in U.S. Pat. Nos. 4,647,781 and 4,883,956. As disclosed in those patents, the GSO detector is preferably surrounded by boron to reduce the influence of thermal and epithermal neutrons on the detector response. Also, a tungsten or other high density shield (not shown) may be placed between the source 58 and the gamma ray detector 66d to reduce the flux of high energy neutrons incident on the detector. Other embodiments of the well logging instrument may include a plurality of gamma ray detectors.

Although not shown, it will be understood that appropriate timing and control circuitry will be provided to operate the source 58 in a pulsed mode and to gate (time the detecting by) the gamma ray detector 66d as needed selectively to detect inelastic and/or capture gamma rays. The energy detection range is preferably broad, e.g., from 0.1 to 11 MeV. A principal purpose of the gamma ray detector 66d is to provide inelastic and/or capture gamma ray energy spectra and energy window count rates. In particular, the energy spectra can be spectrally analyzed to derive information concerning the elemental composition of the formations under investigation.

Measurements of the epithermal neutron slowing down time and tool standoff from the borehole wall may be derived from the outputs of the epithermal neutron detectors 66a, 66b. Because the large amount of steel present in the drill collar 40 and the chassis 54 acts as a long-lifetime storage "sink" for neutrons, the sensitivity of the detectors 66a, 66b to epithermal neutron slowing down time should be substantially reduced in a measurement while drilling (MWD)-adapted logging instrument. To measure epithermal neutron slowing down time while drilling, therefore, it is important to properly locate the detectors 66a, 66b relative to the drill collar 40, to provide properly constructed neutron windows 70a, 70b and to properly back-shield the detectors 66a, 66b. As shown in FIGS. 2 and 3 and as noted above, the sensitive volumes of the detectors 66a, 66b are preferably mounted in the tool chassis 54 closely adjacent the inner wall of the drill collar 40 and immediately opposite the respective neutron windows 70a, 70b in the drill collar 40. Each detector is also preferably back-shielded (with B4CE or the like) on both ends and on all sides except the side facing the drill collar. The windows 70a, 70b are preferably provided on the exterior of the drill collar 40 in the region of the detectors. Modeling and experimental data have shown that the sensitivity of the epithermal neutron slowing down time curves to porosity from detectors positioned, shielded and windowed in this way is greater than for detectors without windows or external boron shielding.

The foregoing example of a pulsed neutron well logging instrument is meant only to illustrate one type of instrument structure which may be used with various embodiments of a method according to the invention. Other configurations of pulsed neutron well logging instrument may be used with various embodiment of the invention, as long as the particular instrument used includes a detector configured to enable detection of at least one type of neutron interaction phenomena which are enabled or facilitated by short duration neutron bursts, and includes a detector adapted to measure "long burst" duration related phenomena, including but not limited to neutron capture cross section related phenomena. The long burst phenomena detector may be such types as thermal neutron or capture gamma ray detectors. "Short duration" phenomena as used herein includes, in particular, but is not limited to, inelastic gamma ray related phenomena, neutron slowing down time related phenomena, and short duration capture cross section related phenomena.

Having explained an example pulsed neutron well logging instrument, the manner in which a pulsed neutron instrument using a method according to the invention makes such measurements will now be explained. A prior art neutron burst and detector operating timing diagram, representing neutron burst and detector timing such as is used with the instrument shown in FIGS. 1–3, is shown in FIG. 4. The pulsed neutron source (58 in FIG. 1) is operated in a first mode to generate bursts of neutrons having a duration selected to enable measurement of inelastic gamma ray spectra, and neutron slowing down time. These bursts are shown generally at 201, and each has a duration of about 10 microseconds. As is known in the art, having relatively short duration bursts helps in making measurements of inelastic gamma ray phenomena. Following each such burst 201 is a detection interval of about 30 microseconds duration, shown generally at 202. In the prior art instrument, this cycle is repeated 30 times. After the last short duration burst measurement cycle, a relatively long burst, of about 100 microseconds duration, shown at 203, is generated for the purpose of irradiating the formation so as to enable making measurements related to the neutron capture cross section of the formation. The long burst 203 is followed by a detection window 204, of about 700 microseconds duration, for detecting capture gamma rays to determine formation capture cross section. This entire measurement cycle 205, including the short bursts and the long burst and detection window 204, is repeated sixty one times. Following the sixty first repetition of the entire measurement cycle 205 is a background radiation measurement window, shown at 206 in FIG. 4, of about 3,000 microseconds duration. The sixty one measurement cycles 205 and the background window 206 together comprise a measurement "frame" of about 125 milliseconds (125,000 microseconds) duration. In the prior art neutron burst timing shown in FIG. 4, only about 75 percent of the total number of neutrons generated in all the bursts in each frame can be used to measure short burst related (e. g. inelastic gamma and neutron slowing down) phenomena. This percentage is determined from the thirty, 10 microsecond duration inelastic gamma ray/neutron slowing down time bursts (300 microseconds total burst time) and the one, 100 microsecond capture cross-section burst. 300 of the 400 total microseconds of burst time, therefore, are used to measure inelastic gamma ray and slowing down time properties of the earth formation.

Figure 5:
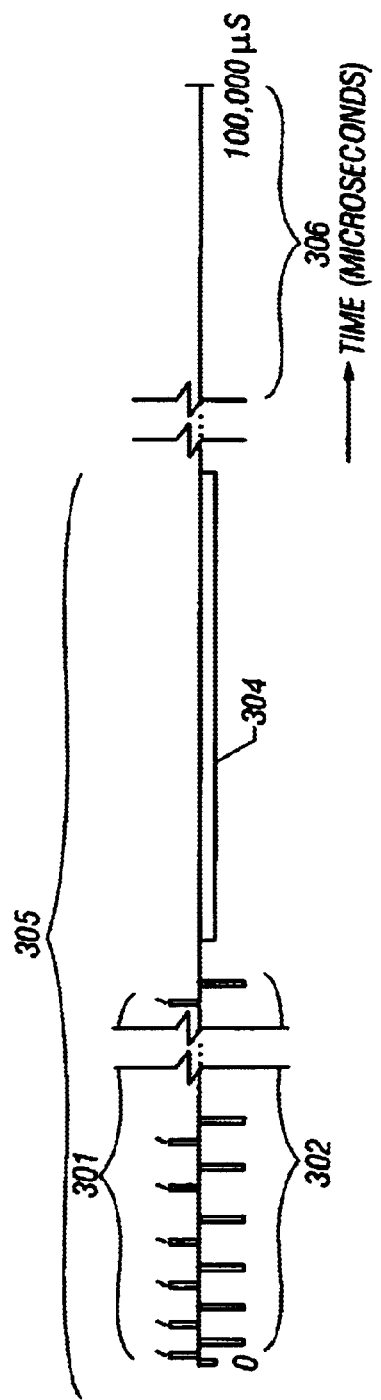
FIG. 5 shows an example of a neutron burst timing scheme according to the invention which can be used with an instrument such as shown in FIG. 1.

One example of a neutron burst timing method according to the invention is shown in a timing diagram in FIG. 5. In a neutron burst timing method according to the invention, a number of short duration bursts are generated, as shown at 301, for the purpose of enabling measurement of short burst duration related phenomena, such as inelastic gamma ray phenomena, neutron slowing down time phenomena and/or short-duration capture cross-section related phenomena, using appropriately timed detection events, as shown at 302.

Measuring short-duration capture cross section related phenomena after a short-duration burst is known in the art. See for example, U.S. Pat. No. 4,926,044 issued to Wraight referred to in the Background section herein. Each of these types of neutron induced phenomena is enabled or aided by having the neutron bursts be of relatively short duration. Irrespective of the type of neutron-induced phenomena measured, it is only necessary in various embodiments of the invention to detect the short-duration neutron induced phenomena during or after at least one, and preferably during or after a plurality of or all of the short duration neutron bursts. As is known in the art, inelastic gamma ray phenomena are typically measured during the neutron burst, and neutron slowing down time and short capture cross section related phenomena are typically measured right after the end of the neutron burst. The statistical precision of the short duration burst-related measurements will typically be increased in relation to the number of neutron bursts during or after which the particular measurement is made.

In one embodiment of a method according to the invention, the short burst timing events are repeated 32 times. In this embodiment, the duration of each neutron burst is approximately 10 microseconds, and a detection window 302 after each such neutron burst is about 25 microseconds. Other burst and detection window durations, as previously explained, may be used in other embodiments of the invention. The particular length of each such neutron burst and length of each detection window will depend on factors such as the detector type, the detector spacing from the pulsed neutron source, and the acceptable statistical precision and accuracy of the measurements made by the instrument, among other factors. After the last short neutron burst timing event, a long duration neutron burst phenomena detection window is opened, as shown at 304. In one embodiment of the method, the long duration phenomena window is about 400 microseconds duration. In one example embodiment, a measurement frame 305 includes sixty-two repetitions of the foregoing measurement cycle of thirty two short duration bursts and immediately subsequent measurement windows, followed by a long duration neutron burst phenomena measurement window. After the sixty-second measurement frame, in this particular embodiment, a background radiation detection window 306 is set. In this particular embodiment, the background window is about 7,000 microseconds long. The length of the background window 306 may be different in other embodiments, but generally should be long enough to make an accurate determination of natural gamma radiation originating in the earth formations surrounding the well logging instrument, as well as any activated gamma rays. The time with respect to the neutron bursts, and the duration of the background window will depend on the duration and number of neutron bursts, the type of neutron source used, the type of detectors used and their axial spacing from the neutron source, among other factors.

It has been determined, in various embodiments of a method according to the invention, that a plurality of relatively short duration neutron bursts is capable of stimulating the earth formation to make acceptably accurate and precise measurements of long burst related formation properties, including the formation neutron capture cross section, without the need for separate, longer duration neutron bursts to stimulate the formation therefor. An advantage of a neutron burst and measurement timing sequence according to the invention is that substantially all of the neutrons generated in the plurality of short-duration bursts may be used to measure neutron stimulated phenomena, measurements of which can be improved by short duration neutron bursts. Examples of such short duration burst related phenomena include, for example, neutron slowing down time related phenomena, inelastic gamma ray phenomena, and short-capture cross section related phenomena. As is known in the art, short neutron burst related phenomena measurements are often subject to statistical imprecision. This particularly the case for neutron slowing down time related phenomena. Increasing the number of short-burst measurements, such as neutron slowing down time measurements, in each measurement cycle may improve the statistical precision of slowing down time related measurements.

The lengths of the neutron bursts, the lengths of short duration burst measurement windows (including, for example, slowing down time, short capture cross section and inelastic measurement windows), the lengths of the long burst phenomena windows, the number of such windows and the number of measurement cycles as described herein are representative examples of neutron burst and radiation event detection timing that may be used in various embodiments of the invention. In any embodiment of a method according to the invention it is only necessary for the duration of the neutron bursts be selected to enable detection of the short burst duration phenomena, such as inelastic gamma ray related phenomena. Preferably the burst and short duration detecting is repeated enough times in any measurement frame to enable measurement of the short neutron burst related phenomena to a selected degree of statistical precision. The number of neutron bursts in any measurement sequence, prior to the capture cross section measurement window, will depend on the desired statistical precision of the short duration burst phenomena measurements, as well as the desired statistical precision of the capture cross section measurement.

The length of the long burst phenomena window in some embodiments may be selected to provide the overall measurement sequence ("sequence" being defined as the plurality of selected duration neutron bursts followed by or coincident with short burst duration measurement windows, these being followed by the long burst phenomena window) with a suitable "duty cycle" for the neutron source (58 in FIG. 1). Duty cycle is defined as the fraction of total sequence time in which the source generates neutrons. In the present embodiment, the duty cycle is approximately 20 percent. As is known in the art, a preferred duty cycle depends on the configuration of the actual neutron source used, and the type of, number of and axial spacings from the source of the various detectors used in any particular well logging instrument. In the present embodiment, the length of the long burst phenomena window was selected to provide both a preferred duty cycle for the neutron source as well as sufficient statistical precision of a neutron capture cross section measurement. More preferably, the duration of the long burst phenomena window is selected to provide sufficient statistical precision to the neutron capture cross section measurement at the highest expected capture cross section expected for the particular earth formations being measured. A typical value for neutron capture cross section at which statistical precision is to be optimized is about 40 capture units (c. u.). As is known in the art, higher capture cross section will typically result in reduced statistical precision of the measurement. In other embodiments of a method according to the invention, the long burst phenomena window may be shortened or lengthened to provide sufficient statistical precision at other maximum expected values of capture cross section. In some embodiments, the number of, and/or duration of the neutron bursts may be adjusted to provide a preferred duty cycle for the neutron source when a different length capture cross section window is used with any particular embodiment of a timing sequence. In yet other embodiments, the length of the long burst phenomena window is selected to optimize an accuracy of the measurement of neutron capture cross section. As is known in the art, the accuracy of measurement of neutron capture cross section is increased by increasing the length of the measurement of neutrons or capture gamma rays used to determine formation neutron capture cross section. Accuracy may be optimized individually, or in conjunction with optimizing neutron generator duty cycle and/or statistical precision of the measurement.

In still other embodiments, the length of the capture cross section window and the number of neutron bursts/short burst duration related measurements in any measurement cycle may be selected to optimize the statistical precision of the long burst phenomena related measurement, the short burst duration related measurement, and the duty cycle of the neutron source.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for measuring neutron interaction properties of an earth formation, comprising:

irradiating the formation with bursts of high energy neutrons, the bursts having a duration selected to enable detection of short duration neutron burst related phenomena;

detecting, during or after at least one of the bursts, the short duration neutron burst related phenomena; and after a selected number of the bursts, detecting long duration neutron burst-related phenomena.

2. The method as defined in claim 1 wherein the long duration neutron burst phenomena comprise capture gamma rays.

3. The method as defined in claim 1 wherein the long duration neutron burst phenomena comprise thermal neutrons.

4. The method as defined in claim 1 wherein a length of time for the detecting long duration neutron burst related phenomena is selected to optimize a duty cycle for a pulsed neutron source used to perform the irradiating.

5. The method as defined in claim 1 wherein a length of time for the detecting long duration neutron burst related phenomena and a number of the neutron bursts in a measurement cycle are selected to optimize a duty cycle for a pulsed neutron source used to perform the irradiating.

6. The method as defined in claim 1 wherein a length of time for the detecting long duration neutron burst related phenomena is selected to optimize a statistical precision of a measurement of a neutron capture cross section of the formation while optimizing a duty cycle for a pulsed neutron source used to perform the irradiating.

7. The method as defined in claim 1 wherein a length of time for the detecting long duration neutron burst related phenomena and a number of the neutron bursts in a measurement cycle are selected to optimize a statistical precision of a measurement of a neutron capture cross section of the formation while optimizing a duty cycle for a pulsed neutron source used to perform the irradiating.

8. The method as defined in claim 1 wherein a length of time for the detecting long duration neutron burst related phenomena is selected to optimize an accuracy of a long duration burst related measurement of a property of the formation.

9. The method as defined in claim 1 wherein the short duration burst related phenomena comprise at least one of inelastic gamma ray related phenomena, neutron slowing down time related phenomena and short capture cross section related phenomena.

10. The method as defined in claim 1 further comprising monitoring an output of a neutron source used to performed the irradiating, and normalizing measurements of short duration neutron burst related phenomena and neutron capture cross section made during the detecting thereof.

11. The method as defined in claim 1 further comprising repeating the irradiating, the detecting short duration neutron burst related phenomena and the detecting long duration neutron burst related phenomena for a selected number of times, and detecting background radiation from the formation for a selected time interval thereafter.

12. The method as defined in claim 1 further comprising measuring the short duration neutron burst related phenomena after a plurality of the neutron bursts to improve a statistical precision of measurements made therefrom.

13. A method for measuring neutron interaction properties of an earth formation, comprising:
    irradiating the formation with bursts of high energy neutrons, the bursts having a duration selected to enable detection of inelastic gamma ray related phenomena;
    detecting, during each of the bursts, the inelastic gamma ray related phenomena; and
    detecting long duration neutron burst-related phenomena after a selected number of repetitions of the irradiating and the detecting inelastic gamma ray related phenomena.

14. The method as defined in claim 13 further comprising measuring neutron slowing down related phenomena after each of the bursts.

15. The method as defined in claim 13 further comprising repeating the irradiating, the detecting inelastic gamma ray related phenomena and the detecting long duration neutron burst related phenomena for a selected number of times, and detecting background radiation from the formation for a selected time interval thereafter.

16. The method as defined in claim 15 wherein a length of time for the detecting long duration neutron burst related phenomena and a number of the neutron bursts in a measurement cycle are selected to optimize a statistical precision of a measurement of a neutron capture cross section of the formation and a statistical precision of a measurement of the inelastic gamma rays while optimizing a duty cycle for a pulsed neutron source used to perform the irradiating.

17. The method as defined in claim 13 wherein a length of time for the detecting long duration neutron burst related phenomena is selected to optimize an accuracy of a measurement of neutron capture cross section of the formation.

18. The method as defined in claim 13 further comprising measuring short duration capture cross section related phenomena after each of the bursts.

19. The method as defined in claim 13 wherein the long duration neutron burst related phenomena comprise capture gamma rays.

20. The method as defined in claim 13 wherein the long duration neutron burst related phenomena comprise thermal neutrons.

21. The method as defined in claim 13 wherein a length of time for the detecting long duration neutron burst phenomena is selected to optimize a duty cycle for a pulsed neutron source used to perform the irradiating.

22. The method as defined in claim 13 wherein a length of time for the detecting long duration neutron burst phenomena is selected to optimize a statistical precision of a measurement of neutron capture cross section of the formation while optimizing a duty cycle for a pulsed neutron source used to perform the irradiating.

23. A method for logging earth formations, comprising:
    lowering a pulsed neutron logging instrument into a wellbore drilled through the earth formations, the instrument comprising a controllable source of high energy neutrons and detectors adapted to detect neutron slowing down time related phenomena, neutron capture cross-section related phenomena, and inelastic gamma ray phenomena;
    irradiating the earth formations with bursts of high energy neutrons, the bursts having a duration selected to enable detection of the inelastic gamma ray phenomena;
    detecting the inelastic gamma ray phenomena during each of the bursts;
    detecting the neutron slowing down time related phenomena after each of the bursts; and
    after a selected number of the bursts, detecting the long duration neutron burst-related phenomena.

24. The method as defined in claim 23 wherein the long duration neutron burst phenomena comprise capture gamma rays.

25. The method as defined in claim 23 wherein the long duration neutron burst related phenomena comprise thermal neutrons.

26. The method as defined in claims 23 further comprising detecting short duration capture cross section related phenomena after each of the bursts.

27. The method as defined in claim 23 wherein the lowering into the wellbore comprises attaching the well logging instrument to a drill string and performing the irradiating, the detecting during at least one burst, the detecting after at least one burst, and the detecting after a selected number of bursts during drilling of the wellbore.

28. The method as defined in claim 23 wherein the lowering into the wellbore comprises attaching the well logging instrument to one end of an electrical cable, and extending and retracting the electrical cable.

29. The method as defined in claim 23 wherein a length of time for the detecting long duration neutron burst phenomena is selected to optimize a duty cycle for a pulsed neutron source used to perform the irradiating.

30. The method as defined in claim 23 wherein a length of time for the detecting long duration neutron burst phenomena is selected to optimize a statistical precision of a measurement of neutron capture cross section of the formation while optimizing a duty cycle for a pulsed neutron source used to perform the irradiating.

31. The method as defined in claim 30 wherein a length of time for the detecting long duration neutron burst related phenomena and a number of the neutron bursts in a measurement cycle are selected to optimize a statistical precision of a measurement of a neutron capture cross section of the earth formations and a statistical precision of a measurement of the inelastic gamma ray related phenomena while optimizing a duty cycle for a pulsed neutron source used to perform the irradiating.

32. The method as defined in claim 23 wherein a length of time for the detecting long duration neutron burst related phenomena is selected to optimize an accuracy of a long duration burst phenomena related measurement of a property of the formation.

33. The method as defined in claim 23 further comprising monitoring an output of a neutron source used to perform the irradiating, and normalizing measurements of at least one of inelastic gamma ray phenomena, neutron slowing down time and capture cross section made from the detecting thereof.

34. The method as defined in claim 23 further comprising repeating the irradiating, the detecting inelastic gamma ray phenomena, the detecting neutron slowing down phenomena and the detecting capture cross section phenomena for a selected number of times, and detecting background radiation from the formation for a selected time interval thereafter.

35. An instrument for detecting neutron interaction phenomena in earth formations surrounding a wellboro, comprising:
- a source or high energy neutrons, the source adapted to emit multiple short duration bursts of the high-energy neutrons;
- radiation detectors, at least one of the detectors adapted to detect neutron slowing down rotated phenomena, at least one of the detectors adapted to detect inelastic gamma ray related phenomena, at least one of the detectors adapted to detect phenomena related with a long duration neutron burst; and
- a controllor operatively coupled to the source and to the radiation detectors, the controller adapted to cause the neutron source to emit multiple short duration bursts of high energy neutrons to enable detection of the inelastic gamma ray phenomena, the controller adapted to cause detection of the inelastic phenomena during each burst, the controller adapted to cause detection of the capture cross section phenomena after the end of a selected number of the bursts; the controller adapted to cause the neutron source to cease neutron emission to permit detection or phenomena, related with a long duration neutron burst, stimulated by multiple short duration neutron bursts.

36. The instrument as defined in claim 35 wherein the controller is adapted to operate the detectors to detect background radiation after a selected number of repetitions of the selected number of bursts and detection of the capture cross section phenomena thereafter.

37. The instrument as defined in claim 35 further comprising at least one radiation detector operatively coupled to the controller and adapted to detect neutron slowing down related phenomena, the controller adapted to operate the at least one neutron slowing down related phenomena detector after each of the neutron bursts.

38. The instrument as defined in claim 35 further comprising at least one detector adapted to monitor an output of the neutron source to enable normalizing measurements of at least one of the inelastic gamma ray related phenomena, the neutron slowing down time related phenomena and the capture cross section related phenomena.

39. The instrument as defined in claim 35 wherein the controller is adapted to operate the detectors for the detecting long duration neutron burst related phenomena for a time selected to optimize a duty cycle for the neutron source.

40. The instrument as defined in claim 35 wherein the controller is adapted to operate the detectors for the detecting long duration neutron burst related phenomena for a time selected to optimize a statistical precision of a measurement of neutron capture cross section of the formation while optimizing a duty cycle for the neutron source.

41. The instrument as defined in claim 35 wherein the controller is adapted to operate the detectors for the detecting long duration neutron burst related phenomena and to operate the source so that a number of the neutron bursts in a measurement cycle and a detection time are selected to optimize a statistical precision of a measurement of a neutron capture cross section of the formation and a statistical precision of a measurement of the inelastic gamma rays while optimizing a duty cycle of the source.

42. The instrument as defined in claim 35 wherein the controller is adapted to operate the detectors for the detecting long duration neutron burst related phenomena for a time selected to optimize an accuracy of a long duration burst related measurement of a property of the formation.

43. The instrument as defined in claim 35 wherein the controller is adapted to operate the detectors to detect short capture cross section related phenomena after each of the neutron bursts.

44. The instrument as defined in claim 35 wherein the at least one of the detectors adapted to detect long duration neutron burst related phenomena comprises a thermal neutron detector.

45. The instrument as defined in claim 35 wherein the at least one of the detectors adapted to detect long duration neutron burst related phenomena comprises a gamma ray detector.

* * * * *